UNITED STATES PATENT OFFICE 2,474,839

BETA-DITHIOCARBAMYL CARBOXYLIC ACID COMPOUNDS AND THEIR PREPARATION

Thomas L. Gresham and Jacob Eden Jansen, Akron, Ohio, assignors to The B. F. Goodrich Company, New York, N. Y., a corporation of New York No Drawing. Application October 5, 1945, Serial No. 620,663

9 Claims. (Cl. 260—429)

This invention relates to beta-dithiocarbamyl derivatives of carboxylic acids, particularly propionic acid, and to a method of preparing the same.

It is disclosed in U. S. Patent 2,356,459 to Frederick E. Küng that beta-lactones, that is, lactones or inner esters of beta hydroxy carboxylic acids, may be obtained in good yields by the reaction of a ketene with an aldehyde or ketone. In this manner, beta-propiolactone (also called hydroacrylic acid lactone) which has the structure

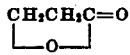

is economically obtained from ketene and formaldehyde.

We have now discovered that beta-propiolactone and also the other beta-lactones will react with salts of dithiocarbamic acids to form salts of beta-dithiocarbamyl carboxylic acids, and the free acids on acidification, which acids and salts are new compounds useful for a variety of purposes.

The reaction proceeds in general as represented by the following equation:

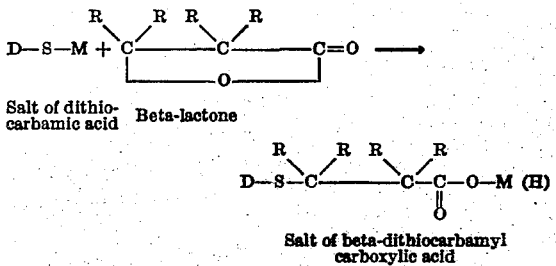

where D is a thiocarbamyl group including unsubstituted and substituted thiocarbamyl groups; M is a positive salt forming group and R is hydrogen or a substituent radical.

This reaction has been found to proceed quite readily without special conditions whenever it is possible to bring the reaction into effective contact with one another. Since dithiocarbamates are not appreciably soluble in beta-lactones, bringing together of the reactants is ordinarily accomplished by the use of a solvent in which the salt will dissolve and ionize, and which also will dissolve the lactone. Many beta-lactones and many dithiocarbamic acid salts are soluble in water; hence, the carrying out of the reaction in aqueous solution is by far the most convenient method of procedure, although in some instances it may be desirable to employ other polar solvents such as alcohols.

As indicated by the general equation, one molecular proportion of beta-lactone for each molecular proportion of the dithiocarbamate is theoretically required for the reaction and substantially this amount is preferably employed, but an excess of either of the reactions may be used without any substantial influence on the yield of products. Other conditions for the reaction, such as temperature and pressure are not critical and may be varied widely. Highest yields of the desired product are generally secured when working at temperatures of 0 to 100° C., preferably from 0 to 50° C., and at atmospheric pressure. The most convenient temperature, especially when the reaction is carried out in aqueous solution is from about 20 to 50° C., since the reaction is exothermic and this temperature is maintained without appreciable heating or cooling of the solution. Temperatures as low as —20° C. or lower, or as high as 200° C. or higher, however, are also operable.

Any desired salt of a dithiocarbamic acid may be used to react with the beta-lactones. Since the reaction is preferably conducted in aqueous solution, dithiocarbamates which are water-soluble are, of course, preferably used. Examples of preferred salts of dithiocarbamic acids include the alkali metal and ammonium salts of unsubstituted dithiocarbamic acid, and the dithiocarbamates prepared by the reaction of an organic amine with carbon disulfide in alkaline solutions. These latter dithiocarbamates contain an organic radical, which may be either aliphatic, aromatic, or alicyclic in nature, and is preferably composed only of hydrogen and carbon atoms, attached to the nitrogen of the thiocarbamate structure. Typical examples of such dithiocarbamates include the alkali metal and ammonium salts of dialkyl-dithiocarbamic acids such as diethyl, dipropyl, dibutyl, dihexyl, and didodecyl dithiocarbamic acids; alkali metal and ammonium salts of aryl substituted dithiocarbamic acids such as phenyl dithiocarbamic acid, dibenzyl dithiocarbamic acid and the like; alkali metal and ammonium salts of cycloalkyl dithiocarbamic acids such as dicyclohexyl dithiocarbamic acid and the like, and alkali metal and ammonium salts of alkylene dithiocarbamic acids such as methylene dithiocarbamic acid, pentamethylene dithiocarbamic acid, hexamethylene dithiocarbamic acid, and the like. While the alkali metal and ammonium salts and other water-soluble salts of dithiocarbamic acids are preferred, the use of other salts of dithiocarbamic acids is not excluded.

Beta-propiolactone, the simplest possible beta-lactone, is the preferred beta-lactone for use in this invention because of its low cost, and the ease with which it reacts with dithiocarbamates to produce beta (dithiocarbamyl) propionic acid compounds. However, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valerolactone and the like may also be used, as may other beta-lactones, to produce numerous other beta-dithiocarbamyl carboxylic acid compounds. Other known beta-lactones include lactones of beta-hydroxy-monocarboxylic acids containing cycloalkyl, aryl and aralkyl substituents such as beta-cyclohexyl-beta-propiolactone, beta-phenyl-beta-propiolactone, alpha-phenyl-beta-propiolactone, beta-benzyl-beta-propiolactone and the like, all of which, like beta-propiolactone and its homologs, are of the general structure

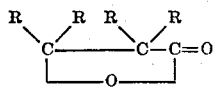

wherein R is hydrogen or an unreactive hydrocarbon group (i. e., a hydrocarbon group free from aliphatic unsaturation) and may be prepared in the manner described in the above-mentioned Küng patent. Still other known beta-lactones include lactones of unsaturated beta-hydroxy carboxylic acids, mono-beta-lactones of dicarboxylic acids and dilactones of dicarboxylic acids in which at least one of the lactones is beta, examples of which are alpha, alpha-dimethyl-beta-propiolactone-beta-carboxylic acid; trimethyl-beta-propiolactone-beta-carboxylic acid; beta, beta-dimethyl-beta-propiolactone-alpha-carboxylic acid; trimethyl-beta-propiolactone-alpha-carboxylic acid and the beta-delta-dilactone of citrylidene malonic acid, all of which like the beta-lactones before mentioned are composed exclusively of hydrogen, carbon and carbonoxy

oxygen atoms. In addition to these compounds other compounds containing the structure

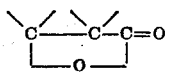

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta (o-nitro-m-chlorophenyl)-beta-propiolactone; beta-(o-nitro-m-methoxyphenyl)-beta-propiolactone; alpha-hydroxy-beta-phenyl-beta-propiolactone and alpha-bromo-beta, beta-dimethyl-beta-propiolactone-alpha-carboxylic acid.

Thus, any of the generic class of beta-lactones may be used in the practice of this invention. When the reaction is carried out in aqueous solution, as is preferred, beta-lactones which are soluble in water (those beta-lactones containing no more than about six carbon atoms possess this property) are of course used.

The beta-dithiocarbamyl carboxylic acids and their salts obtained as products of the reaction are quite useful organic compounds. Besides being useful as intermediates in the preparation of other compounds, they are also of value in the rubber and plastic and other chemical industries, and for their biological and physiological activities. The free acids, and their polyvalent metal salts such as those of zinc, calcium, barium, lead, iron, cobalt, etc.; mixed polyvalent metal salts of such acids with other organic acids, or with organic mercaptans, and complexes of the zinc salt with organic amines, and the like, are particularly useful as accelerators and activators for the vulcanization of rubber, synthetic rubber, and vulcanizable synthetic resins. The free acids are also quite useful as modifiers for the polymerization of conjugated dienes, such as butadiene-1,3. Furthermore, the free acids and the alkali metal and ammonium salts thereof are useful when combined with a fluent carrier, as agents for the control of insects, as fungicides, and for other biological purposes. All these compounds are characterized structurally by possessing a dithiocarbamyl radical attached to a carbon atom in beta-position to a carboxylic acid function consisting of a carbonyl group attached to an oxygen atom which is in turn attached to a positive radical of an ionizable compound, such as hydrogen (the positive radical of acids and water) or an ammonium, substituted ammonium or metallic radical (all of which are positive radicals of bases and salts).

Of these compounds, the beta-dithiocarbamyl propionic acid compounds are particularly important because of the low cost with which they may be prepared from dithiocarbamates and beta-propiolactone. Such compounds possess the general formula:

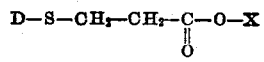

wherein D is a thiocarbamyl radical (a radical whose connecting valence is attached to a thiono group in turn attached to an amine nitrogen atom, preferably of the formula

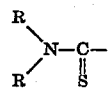

where R is hydrogen or hydrocarbon, particular alkyl), and X is hydrogen (the compound then being an acid) or an ammonium or substituted ammonium radical or a radical having its valence on a metallic element (the compound then being a salt).

In order further to illustrate the invention, the following specific examples of typical compounds of the types described, and the method of preparing them are hereinafter set forth, but it is to be understood that the invention is not limited thereto. Unless otherwise indicated, all parts are by weight.

*Example 1*

An aqueous solution containing 55 parts of ammonium dithiocarbamate dissolved in 100 parts of water is prepared, and to this solution 36 parts of beta-propiolactone are added with stirring at a temperature of 20 to 30° C. over a period of about one-half hour. The reaction mixture is then acidified by the addition of 50 volumes of 37½% hydrochloric acid, whereupon a copious, white precipitate is formed. The compound precipitated is filtered from the solution and recrystallized from ether. By molecular weight determination, carbon, hydrogen, sulphur and nitrogen determination, and acid number the compound is identified as beta-dithiocarbamyl propionic acid of the structure

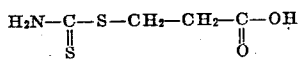

Its melting point is 125 to 126° C. The yield is 92%.

Example 2

Beta-propiolactone and ammonium dithiocarbamate are reacted as in Example 1. The reaction product consisting of a water solution of the ammonium salt of beta-dithiocarbamyl propionic acid is then treated with an aqueous solution of zinc chloride. A white solid, which is identified as the zinc salt of beta-dithiocarbamyl propionic acid, and which possesses a melting point of 145° C. is obtained in quantitative yield. Both the solution of the ammonium salt and the zinc salt are useful as insecticides, fungicides, etc. When the zinc salt is suspended in boiling benzene and treated with two molecular equivalents of cyclohexyl amine, a product which is a viscous, colorless oil, is obtained. This cyclohexylamine complex of the zinc salt of beta-dithiocarbamyl propionic acid is also useful as an insecticide, fungicide, as an accelerator of vulcanization, and the like.

Example 3

34.2 parts of sodium diethyl dithiocarbamate is dissolved in 200 parts of water; to this solution 14.4 parts of beta-propiolactone are added with stirring over a period of 15 minutes keeping the temperature at about 20 to 30° C. After the reaction product is allowed to stand for 30 more minutes, it is acidified with concentrated hydrochloric acid, and a solid compound precipitates. The precipitate is filtered, washed and dried whereupon a 79% yield of beta-diethyl ammonium dithiocarbamyl propionic acid is obtained. This compound has a melting point of 94 to 95° C. and is useful as an accelerator of vulcanization.

Numerous variations and modifications will be apparent to those skilled in the art and are included within the spirit and scope of the invention as defined in the appended claims.

We claim:
1. The method of preparing a beta-dithiocarbamyl carboxylic acid compound which comprises reacting in a liquid medium selected from the class consisting of water and alcohol a beta-lactone of the formula

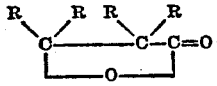

where in each R is selected from the class consisting of hydrogen and alkyl, aryl, cycloalkyl and aralkyl radicals with a salt of a dithiocarbamic acid composed exclusively of atoms of carbon, hydrogen, nitrogen and sulfur, containing only one nitrogen atom and only two sulfur atoms, all present in the characteristic dithiocarbamyl structure.

2. The method of preparing a beta-dithiocarbamyl-substituted saturated aliphatic carboxylic acid which comprises reacting in aqueous solution a water-soluble saturated aliphatic beta-lactone composed exclusively of carbon, hydrogen and two oxygen atoms with a water-soluble salt of a dithiocarbamic acid composed exclusively of atoms of carbon, hydrogen, nitrogen and sulfur, containing only one nitrogen atom and only two sulfur atoms, all present in the characteristic dithiocarbamyl structure.

3. The method of preparing a beta-dithiocarbamyl propionic acid compound which comprises reacting in aqueous solution beta-propiolactone with a water-soluble salt of a dithiocarbamic acid composed exclusively of atoms of carbon, hydrogen, nitrogen and sulfur, containing only one nitrogen atom and only two sulfur atoms, all present in the characteristic dithiocarbamyl structure.

4. The method of preparing beta-dithiocarbamyl propionic acid which comprises reacting in aqueous solution beta-propiolactone with a water-soluble salt of dithiocarbamic acid.

5. The method of preparing beta-dithiocarbamyl propionic acid which comprises adding beta-propiolactone to an aqueous solution of a water soluble salt of dithiocarbamic acid, and then acidifying the solution.

6. The method of preparing a beta-dialkyl dithiocarbamyl propionic acid which comprises reacting in aqueous solution beta-propiolactone and a water-soluble salt of a dialkyl dithiocarbamic acid of the formula

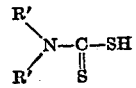

wherein R' represents alkyl, and then acidifying the solution.

7. New chemical compounds selected from the class consisting of beta-dithiocarbamyl propionic acid and its salts.

8. As a new compound, beta-dithiocarbamyl propionic acid.

9. As a new compound, the zinc salt of beta-dithiocarbamyl propionic acid.

THOMAS L. GRESHAM.
JACOB EDEN JANSEN.

REFERENCES CITED

The following references are of record in the file of this patent:

UNITED STATES PATENTS

| Number | Name | Date |
| --- | --- | --- |
| 1,939,692 | Hardman | Dec. 19, 1933 |
| 2,085,401 | Twiss et al. | June 29, 1937 |
| 2,175,809 | Lichty | Oct. 10, 1939 |
| 2,188,280 | Lichty | Jan. 23, 1940 |
| 2,258,847 | Crainer | Oct. 14, 1941 |
| 2,356,459 | Küng | Aug. 22, 1944 |

OTHER REFERENCES

Johansson Chemische Zentralblatt, vol. 87 (1916), pp. 557 and 558.